United States Patent [19]

Sakauchi et al.

[11] Patent Number: 4,702,852

[45] Date of Patent: Oct. 27, 1987

[54] MULTIPOLARLY MAGNETIZED MAGNET

[75] Inventors: Takashi Sakauchi; Fumihiko Mohri; Naohisa Tomoda, all of Ohtsu; Satoshi Nakatsuka, Mohka, all of Japan

[73] Assignee: Kanegafuchi Kagaku Kogyo Kabushiki Kaisha, Osaka, Japan

[21] Appl. No.: 939,850

[22] PCT Filed: Apr. 10, 1986

[86] PCT No.: PCT/JP86/00176

§ 371 Date: Feb. 12, 1987

§ 102(e) Date: Feb. 12, 1987

[87] PCT Pub. No.: WO86/06207

PCT Pub. Date: Oct. 23, 1986

[51] Int. Cl.[4] .......................... C04B 35/04; H01F 1/00; H01F 1/26

[52] U.S. Cl. .................................. 252/62.54; 335/302; 335/303

[58] Field of Search ...................... 252/62.54; 335/302, 335/303

[56] References Cited

U.S. PATENT DOCUMENTS

| | | | |
|---|---|---|---|
| 4,120,806 | 10/1978 | Watanabe et al. | 252/62.5 X |
| 4,120,807 | 10/1978 | Watanabe et al. | 252/62.5 X |
| 4,190,548 | 2/1980 | Baermann | 335/303 |
| 4,200,547 | 4/1980 | Beck | 335/303 |
| 4,308,155 | 12/1981 | Tada et al. | 252/62.5 X |
| 4,327,346 | 4/1982 | Tada et al. | 335/303 |
| 4,549,157 | 10/1985 | Loubier | 335/303 |

FOREIGN PATENT DOCUMENTS 60-12765 4/1985 Japan .

OTHER PUBLICATIONS

Chemical Abstracts, vol. 102 (1985), #104922, (Abstract of JP 59, 161003).

*Primary Examiner*—Arthur P. Demers
*Attorney, Agent, or Firm*—Armstrong, Nikaido, Marmelstein & Kubovcik

[57] ABSTRACT

There is provided a multipolarly magnetized anisotropic plastics magnet formed by molding, followed by solidifying, a composition composed of a magnetic powder and an organic binder in the presence of a magnetic field, and subsequently multipolarly magnetizing the thus obtained anisotropic plastics magnet, said magnetic powder being magnetoplumbite ferrite which is characterized by that the green density is not less than 3.1 $g/cm^3$ and the intrinsic coercive force of the green compact is not more than 2500 oersteds. The plastics magnet is useful as an anisotropic plastics magnet rotor having a great value of surface magnetic field.

3 Claims, No Drawings

MULTIPOLARLY MAGNETIZED MAGNET

DESCRIPTION

TECHNICAL FIELD

The present invention relates to a multipolarly magnetized anisotropic ferrite-based plastics magnet. More particularly, it relates to a multipolarly magnetized anisotropic plastics magnet in which the surface magnetic field produced by magnetization is increased by keeping the coercive force of the raw material ferrite powder below a certain level.

BACKGROUND ART

Anisotropic sintered ferrite magnets are dominant in the area of ferrite-based multipolarly magnetized magnets; but they have a disadvantage of being brittle and poor in dimensional accuracy. To eliminate this disadvantage, there has been proposed the use of ferrite-based plastics magnets. However, they are not satisfactory in magnetic properties, especially the surface magnetic fields resulting from multipolar magnetization, because ferrite in them are diluted by an organic binder. Many attempts are being made to improve the performance of plastics magnets by increasing the residual magnetism and intrinsic coercive force and eventually increasing the maximum energy product which is the typical property of permanent magnets. The increase of maximum energy product, however, does not necessarily leads to the improvement of surface magnetic field resulting from multipolar magnetization. Up to now, there has been no satisfactory solution to this problem.

In order to solve this problem, the present inventors studied the factor that governs the surface magnetic field resulting from multipolar magnetization, and they found that the surface magnetic field greatly increases if a magnet rotor is formed by multipolar magnetization with ferrite having magnetic properties in a specific range. The present invention is based on this finding.

DISCLOSURE OF THE INVENTION

The gist of the present invention resides in a multipolarly magnetized anisotropic plastics magnet formed by molding, followed by solidifying, a composition composed of a magnetic powder and an organic binder in the presence of a magnetic field, and subsequently multipolarly magnetizing the thus obtained anisotropic plastics magnet, said magnetic powder being magnetoplumbite ferrite which is characterized by that the green density is not less than 3.1 $g/cm^3$ and the intrinsic coercive force of the green compact is not more than 2500 oersteds.

In the case of anisotropic plastics magnet, the surface magnetic field formed by multipolar magnetization can be increased to some extent simply by increasing the content of magnetic powder in the plastics magnet or increasing the degree of orientation and hence increasing the anisotropy, whereby increasing the maximum energy product. However, the performance of the magnetic charger is limited even though the maximum energy product is increased, and hence no satisfactory magnetization is accomplished where the plastics magnet has a high coercive force. This is the case particularly where the magnetic poles are magnetized at a small pitch, say, 2 mm or less. It follows, therefore, that even though the maximum coercive force is low, sufficient multipolar magnetization can be accomplished and a great surface magnetic field can be obtained if the intrinsic coercive force is kept below a certain limit.

The ferrite used in this invention is prepared by crushing, followed by heat treatment, magnetoplumbite ferrite represented by the formula $MO \cdot nFe_2O_3$ (M=Ba or Sr, and n=5.5 to 6.5) in such a manner that the resulting powder is composed mainly of single magnetic domains. The ferrite powder thus obtained is characterized by that the green compact formed under a pressure of 1 $t/cm^2$ has a density of not less than 3.1 $g/cm^3$ and the green compact has an intrinsic coercive force of not more than 2500 oersteds. With a green density lower than 3.1 $g/cm^3$, the ferrite cannot be densely filled in the Plastics magnet and the resulting plastics magnet is poor in magnetic properties. Thus the ferrite should preferably have a green density of not less than 3.2 $g/cm^3$. On the other hand, the ferrite should preferably have an intrinsic coercive force of not more than 2500 oersteds, depending on the performance of the magnetic charger to be used. Ferrite having an intrinsic coercive force lower than 2000 oersteds is not preferable because the plastics magnet containing it might suffer from demagnetization at low temperatures, depending on the pattern of magnetization. Where the multipolarly magnetized magnet of this invention is used as the field source for driving a motor, the magnet should preferably have a residual magnetism not less than 2700 gauss in the anisotropic direction of the magnet so that the magnet generates as great a magnetic flux as possible. For the plastics magnet to produce the desired magnetic flux, the ferrite content should be not less than 64 vol %. Where the plastics magnet of this invention is used as a magnetic field source of a position sensor, it is not always necessary that the ferrite be densely filled. Nevertheless, an anisotropic plastics magnet is preferable which is filled with ferrite having an intrinsic coercive force as specified above so that sharp magnetization is made at a pole-to-pole pitch of 1 mm or less which is common in such an application.

The organic binder used in this invention includes a variety of known thermoplastic resins and/or thermosetting resins. It may be incorporated with a stabilizer, slip agent, surface treating agent, and other additives, according to need.

The magnet of this invention should be produced in such a manner that it is provided with maximum anisotropy. To this end, molding should be carried out in the presence of a magnetic field of not less than 5000 oersteds, preferably not less than 10,000 oerseds. For the improved moldability, the molding temperature may be raised to lower the melt viscosity of the organic binder, or a slip agent and other processing aids may be added to the organic binder. Molding can be accomplished by any method commonly used for plastics molding, especially by injection molding.

The multipolarly magnetized anisotropic plastics magnet of this invention develops a great surface magnetic field. It will find use in many application areas such as attraction and field system. It is particularly useful as a rotating magnet of a rotating machine. In this case, the plastics magnet is partly or entirely in the ring form which is anisotropic in the radial directions and is provided with a plurality of poles on the desired parts on the surface thereof. This is one of the preferred embodiments of this invention.

A plastics magnet in the ring form obtained in Example 1 (mentioned later) generates a starting torque of 135 to 145 g·cm with 333 pulses/sec when mounted on a PM stepping motor (single-phase magnetization, and input voltage of 12 V), whereas a plastics magnet in the ring form obtained in Comparative Example 2 with the same ferrite content generates a starting torque of 95 to 110 g·cm.

The Best Mode for Carrying Out the Invention

The invention is now described with reference to the following examples, which are not intended to limit the scope of this invention.

EXAMPLE 1

5 kg of strontium ferrite specified below, 460 g of polyamide-12, and 14 g of Irganox 1098 (Ciba-Geigy Corp.) as a stabilizer were mixed for 20 minutes using a 10-liter Henschel mixer.

Average particle diameter: 1.12 μm

Density of green compact formed under a pressure of 1 t/cm$^2$: 3.2 g/cm$^3$

Residual magnetism (Br) of this green compact: 1830 gauss

Intrinsic coercive force (iHc): 2420 oersteds

The resulting mixture was formed into strands by melt extrusion at 240° C., and the strands were cut into pellets. The pellets were formed into a ring-shaped product using an injection molding machine capable of orientation with a magnetic field and also using a mold having a ring cavity measuring 37 mm in outside diameter, 32 mm in inside diameter, and 10 mm in height. The mold temperature was 80° C. During the injection molding, a magnetic field of 10800 oersteds was applied to the cavity in the radial direction.

The molded product thus obtained was magnetized by a 100-pole charging yoke connected to a capacitor charging-type pulse source. The pole pitch was 1.16 mm. The thus obtained multipolarly magnetized product had a surface magnetic field of 445 gauss on average. It had also the following magnetic properties in the radial direction.

Residual magnetism: 2890 gauss

Intrinsic coercive force: 2650 oersteds

Maximum energy product: $1.95\times10^6$ gauss·oersted

EXAMPLES 2 AND 3

Multipolarly magnetized magnets were produced in the same manner as in Example 1 except that the amounts of strontium ferrite, polyamide-12, and stabilizer were changed as shown in Table 1. The resulting products were examined for magnetic properties. The results are shown in Table 1. They were satisfactory in surface magnetic field.

COMPARATIVE EXAMPLES 1 AND 2

Multipolarly magnetized magnets were produced in the same manner as in Examples 1 and 2, except that the strontium ferrite was replaced by the one as specified below.

Average particle diameter: 1.20 μm

Density of green compact formed under a pressure of 1 t/cm$^2$: 3.29 g/cm$^3$

Residual magnetism of this green compact: 1840 gauss

Intrinsic coercive force: 2870 oersteds

The results are shown in Table 1. It is noted that they had greater values in maximum energy product than those in Examples containing the corresponding amount of ferrite. Nevertheless, they had lower average values in surface magnetic field than those in Examples, because they had a high intrinsic coersive force which makes multipolar magnetization difficult.

TABLE 1

| Example No. | Composition (g) Ferrite | Poly-amide | Stab-ilizer | Average surface magnetic field (gauss) | Maximum energy product (MGs-Oe) |
|---|---|---|---|---|---|
| Example 2 | 5000 (66 vol %) | 500 | 15 | 437 | 1.89 |
| Example 1 | 5000 (68 vol %) | 460 | 14 | 445 | 1.95 |
| Example 3 | 5000 (70 vol %) | 420 | 13 | 465 | 1.98 |
| Compar. Example 1 | 5000 (66 vol %) | 500 | 15 | 384 | 1.92 |
| Compar. Example 2 | 5000 (68 vol %) | 460 | 14 | 394 | 2.20 |

Possibility of Use in Industry

As mentioned above, the present invention provides an anisotropic plastics magnet rotor having a high value of surface magnetic field. It will find use as a rotor of PM-type stepping motor and other rotating machines on account of its small angular moment (resulting from its light weight) and its great value of surface magnetic field.

We claim:

1. A multipolarly magnetized anisotropic plastics magnet formed by molding, followed by solidifying, a composition composed of a magnetic powder and an organic binder in the presence of a magnetic field, and subsequently multipolarly magnetizing the thus obtained anisotropic plastics magnet, said magnetic powder being magnetoplumbite ferrite which is characterized by that the green density is not less than 3.1 g/cm$^3$ and the intrinsic coercive force of the green compact is not more than 2500 oersteds.

2. A multipolarly magnetized anisotropic plastics magnet as set forth in claim 1, wherein the magnet molding is partly or entirely a ring-shaped plastics magnet molding having anisotropy in the radial direction.

3. A multipolarly magnetized anisotropic plastics magnet as set forth in claim 1 or 2, wherein the magnet molding contains not less than 64 vol % of ferrite.

* * * * *